United States Patent

[11] 3,582,666

| [72] | Inventor | Willard Geiger<br>Jeannette, Pa. |
|---|---|---|
| [21] | Appl. No. | 768,840 |
| [22] | Filed | Oct. 18, 1968 |
| [45] | Patented | June 1, 1971 |
| [73] | Assignee | Erico Products, Inc.<br>Cleveland, Ohio |

[54] LIGHT BEAM ALIGNMENT AND PHOTOELECTRIC RECEIVER APPARATUS
8 Claims, 5 Drawing Figs.

[52] U.S. Cl. ........................................... 250/226,
250/229, 250/239, 356/219, 356/225
[51] Int. Cl. ........................................... G01j 1/42,
G01j 3/14
[50] Field of Search........................................... 250/200,
201, 226, 227, 237, 239; 350/319, 96; 356/110,
121, 219, 224, 225; 33/46

[56] References Cited
UNITED STATES PATENTS

| 2,113,450 | 5/1938 | Lasky | 250/227X |
|---|---|---|---|
| 2,912,593 | 11/1959 | Deuth | 250/239X |
| 3,087,379 | 4/1963 | Rogers | 356/219 |

FOREIGN PATENTS

| 813,465 | 6/1937 | France | 356/225 |

*Primary Examiner*—Roy Lake
*Assistant Examiner*—E. R. LaRoche
*Attorney*—Adrian Medert

ABSTRACT: This invention relates to a photoelectric receiver which includes a housing, a lens mounted at one end of the housing and arranged to receive a light beam from a suitable source of light, a photoelectric cell spaced from said lens and supported and surrounded by material capable of transmitting light, an iris plate mounted between the lens and the photoelectric cell at the focal point of the lens and means for making observations of the characteristics of the light transmitted by the light transmitting material surrounding the photoelectric cell.

PATENTED JUN 1 1971

3,582,666

INVENTOR.
WILLARD L. GEIGER

BY Adrian Medert

ATTORNEY ered with respect to the center of the lens 14.

LIGHT BEAM ALIGNMENT AND PHOTOELECTRIC RECEIVER APPARATUS

This invention relates to photoelectric receivers and more particularly to a photoelectric receiver which embodies means for observing the relationship between the photoelectric cell and the beam of light received by the device from a suitable source.

Photoelectric receivers, heretofor used, have presented many problems in adequately fulfilling the purpose for which they have been designed. For example, it is highly necessary to the efficient operation of such a receiver to achieve and maintain proper alignment between the light-responsive member of the device and a source of light. In prior devices, it has been difficult effect such alignment for the reason that there has been no adequate arrangement to indicate that the desirable alignment of the components of the device had been achieved in the assembly thereof. Although extreme care was employed in assembling the components, mechanical limitations prevented the ultimate in perfection.

Prior devices embodied the usual lens, photoelectric cell and in some cases, as iris plate positioned therebetween. The proper relationship between these three elements is essential to obtain satisfactory results in the use of the device. Regardless of the care used in assembly, the characteristics of light-collecting lens are such that uniform assembly procedures cannot be followed. Thus, physical observation must be relied upon to determine the production of a satisfactory receiver. Such observation procedures have included observation of the front of the iris plate and the disappearance of the light beam through an aperture to determine the alignment of the light beam with the iris opening and thus assuming that the photoelectric cell is properly aligned with the light emitted from the iris opening. It is obvious that such an observation procedure assumes that the cell is prepositioned on the center line through the iris opening.

A further observation procedure has been to monitor electrically, the output of the photoelectric cell, maximum output presupposing proper alignment with the light beam. This procedure has been questionable because various misalignments would give identical indications which could not be construed to form a basis upon which suitable adjustments could be made to effect proper alignment A still further observation procedure has entailed observing the effect of a light splash upon the general area of the photoelectric cell. This procedure has entailed the use of prismatic devices or observation elements adjacent to the cell, the observed result being usually questionable due to the manner in which the observation procedure was followed.

It is among the objects of the present invention to provide a photoelectric receiver which overcomes the drawbacks and objectionable features of prior devices, is positive in operation, uniform in performance and can be readily adjusted to adapt the receiver for varying environmental conditions of use.

Another object of the invention is to provide in a photoelectric receiver, means for observing any misalignment of the light-responsive element of the device with a source of light without interferring with the operation of the device and to make adjustment thereof to correct any such misalignment.

A still further object of the invention is to provide a photoelectric receiver which is so assembled and arranged that substantial movement of the device caused by vibration can be tolerated without the device becoming inoperative.

These and other objects and advantageous features of the present invention will become more apparent from the following detailed description of an embodiment thereof taken in conjunction with the accompanying drawing wherein corresponding reference characters throughout denote corresponding parts and wherein.

Figure 1:
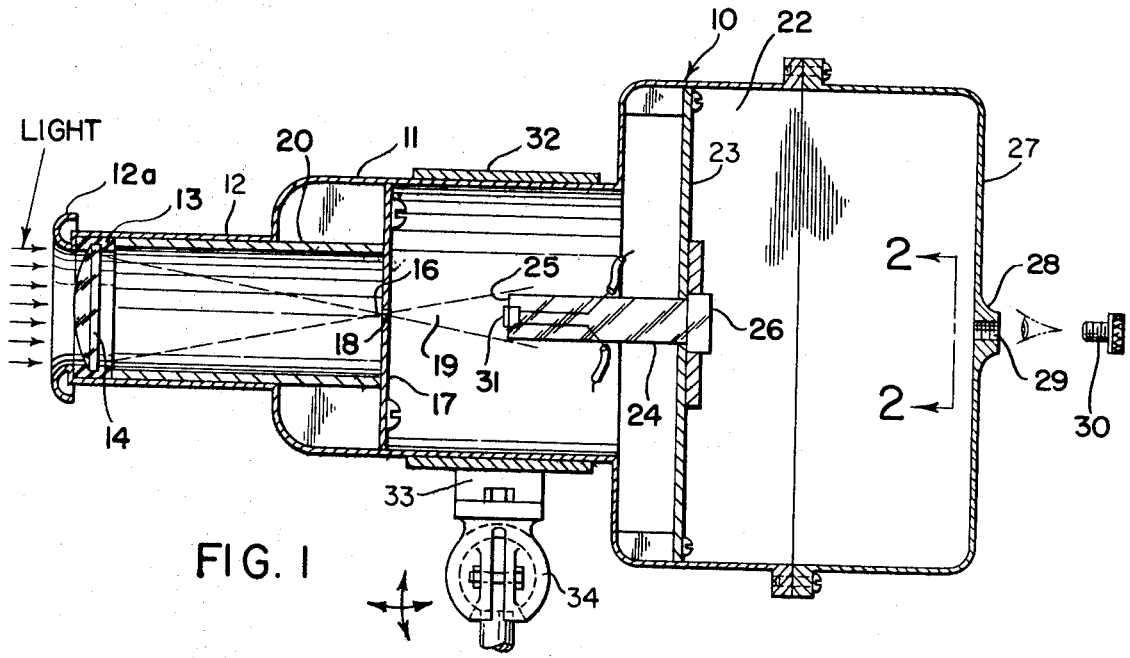
FIG. 1 is a diagrammatic horizontal sectional view, with certain parts broken away, showing in particular, the device of the present invention as it is applied to the problem of properly aligning a light responsive device with a source of light.

With reference to the accompanying drawing and particularly FIG. 1, there is illustrated one embodiment of my invention, shown in the drawing by way of example, wherein the numeral 10 designates a housing which may take any particular form suitable for the environment in which the device is used. The front of the housing 10 is formed with a barrel shaped casing 11 having a tubular extension 12 of reduced diameter terminating in a nose portion 12a. Mounted in the outer end of the tubular extension 12, is a gasket 13 which supports a lens 14. The lens 14 may take any suitable form, however, it is preferable that it be of a type which has been corrected for color aberrations. In other words, it is highly desirable in the operation of the device that the lens assists in a breakdown of the spectrum into its primary colors. When lens 14 is centered on a remote light source it serves to collect parallel light rays and to converge same to a focal point 16.

Suitably mounted within the barrel 11 of the housing 10 at the focal point 16 of the lens 14, is an iris plate 17 having a central iris opening 18 therethrough. The iris plate 17 is preferably of relatively thin metal and the iris opening 18 has a sharp edge thereabout which assists the lens to function as a prism thereby dividing the light beam into its primary colors should there be any misalignment between the light source and the lens and iris system which has been previously fixed in assembling the receiver. The iris plate is positioned at the exact focal length of the lens which has been predetermined. When properly aligned with a light source, the focal point of the lens and the center of the iris opening 18 are coincidental and allow the rays of light passing therethrough to diverge outwardly therefrom in the form of a cone of light 19. Extending from the gasket 13 supporting the lens 14 is a tubular member 20 whose length is determined by the focal length of the lens 14.

Mounted within the chamber 22 defined by the housing 10, is a transverse supporting member 23 which supports a mounting member 24 formed of an acrylic or other suitable light-transmitting substance, having a forward face 25 and a rear face 26. The face 25 of the mounting member 24 is located in the proper place in the cone of light 19 so that when alignment is correct between the receiver and a source of light, the entire face 25 is uniformly lighted. The center of the face 25 is in axial alignment with the iris opening 18 and, in turn, is centered with respect to the center of the lens 14.

The rear wall 27 of the housing 10 is provided with a central hub 28 having an opening 29 extending therethrough to effect visual communication with the interior of the housing 10. The opening 29 is on the center line extending through the center of the lens 14, iris opening 18, center line of the acrylic member 24 and the center of the rear face or portion 26 thereof. The opening provides a means of observing the optical condition of the rear face 26 of the member 24 resulting from the cone of light emitted from the iris opening 18. The observation opening 29 may take any suitable form and is preferably of a size to exclude extraneous light which may interfere with the proper operation of the device. A closure member 30 is provided to engage within the opening 29 when the latter is not in use.

A photoelectric cell 31 is imbedded in the acrylic mounting member 24 flush with the surface 25 and as hereinbefore noted, member 24 may be of any suitable light-transmitting substance or material so that the passage of light rays therethrough may be observed at the rear end thereof as, for example, on the face 26. The face of the photoelectric cell 31 is concentric with the iris opening 18 and is so arranged that it is wholly within the confines of the cone of light emitted from the iris opening 18.

Surrounding the barrel portion 11 of the housing 10 is a sleeve 32 suitably attached to a bracket member 33 which, in turn, is mounted on a swivel joint 34 for providing tiltable and rotatable movement to the housing 10. The universal swivel joint 34 provides a means by which the center of the lens 14 may be properly aligned with the center of a light beam from a suitable source of light pursuant to observations made through the opening 29.

In the use or operation of the device of the present invention, it will be first assumed that the component parts have been properly assembled with relation to each other as hereinabove described with respect to FIG. 1 of the drawing and that all operating connections between the respective members have been made and the device is ready for use.

Figure 2:
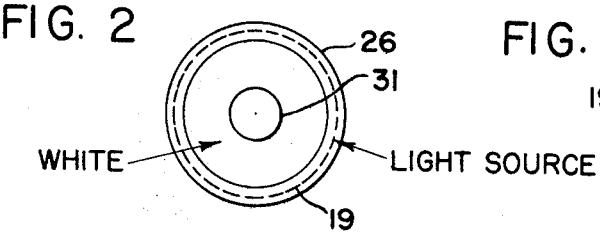
FIG. 2 is a sectional view taken on the line 2-2 FIG. 1, and represents an observation when the elements of the device of the present invention as a unit are in the optimum position with respect to a source of light.
Figure 3:
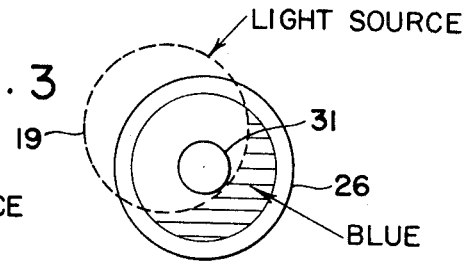
FIGS. 3, 4 and 5 are views similar to FIG. 2 and represent a series of observations when the device of the present invention are in different degrees of misalignment with respect to a light source.
Figure 4:
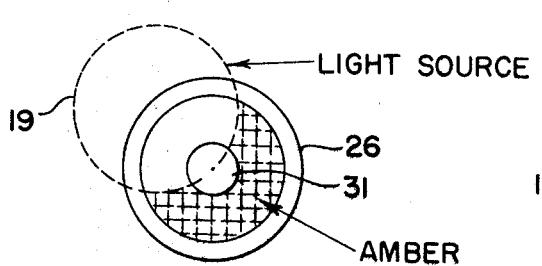
Figure 5:
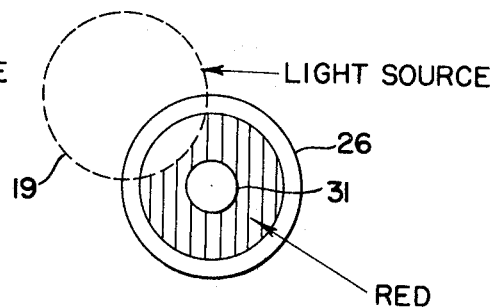

The housing 10 being supported on the universal swivel joint 34, the nose end of the housing containing the lens 14 is directed toward a source of light and is adjusted to pick up the light beam directed at the device. The cover member 30 is removed from the sighting aperture 29 and an observation is made upon the rear face 26 of the acrylic member 24. If the center of the photoelectric cell is properly aligned with the center of the light beam from the source of light, the observation from the aperture 29 will show white on the face 26 as indicated in FIG. 2. Should there be any misalignment of the light beam with respect to the photoelectric cell, the degree of misalignment is readily discerned by the color of the face 26. If the misalignment relatively small, the portion of the face 26 remote from the center line of the light beam will show blue (see FIG. 3). As the misalignment increases, the color of the face 26 will change to a combination of blue-amber and then amber (FIG. 4). With further misalignment, the face 26 will show red (FIG. 5). At this point, the device is on the vary edge of the usable light. Sighting through the opening 29, the housing is tilted or rotated to adjust the lens position with respect to the light beam until such time as the observation of the rear face 26 of the acrylic member 24 shows white. At this point, the device is in perfect alignment with the light beam and is arranged to absorb maximum vibration allowance in all directions without becoming inoperative.

While there has been described therein and illustrated in the accompanying drawings, a presently preferred embodiment of the present invention, it is to be understood that various modifications and refinements which depart from the illustrated embodiment may be adopted without departing from the spirit and scope of the invention.

I claim:

1. A device for aligning a light-responsive element with the beam from a source of light comprising a housing, a lens positioned in an opening in said housing and exposed to the light beam, a disc having a central opening therethrough positioned at the focal point of said lens, a supporting member of light-transmitting material disposed in the cone of light diverging from the opening in said disc, a light-responsive element mounted centrally on the face of said supporting member and means for observing the characteristics of the light falling on the face of said supporting member.

2. Apparatus for obtaining alignment with a remotely located light source, comprising a housing, a lens mounted on said housing and adapted for receipt of light from said light source, said lens having a nominal focal point located within said housing and adapted to disperse the received light into a spectrum of colors at said focal point and focus the received light into a spot central of said spectrum, an opaque member having an aperture therein located at the nominal focal point of said lens, said opaque member being adapted to block the dispersed spectrum of colors from said light source and allow passage of the central spot through said aperture therein when said housing is in accurate alignment with said light source, a light-transmitting member mounted within said housing in alignment with the aperture of said opaque member, and means on said housing for viewing said light-transmitting member thereby to evaluate the color of same and determine when accurate alignment is obtained.

3. Apparatus as set forth in claim 2 further including a photoelectric cell mounted on said light transmitting member and adapted for response to the light passed through said aperture.

4. Apparatus as set forth in claim 3 wherein said light transmitting member is a bar of acrylic material in alignment with said aperture and having a face exposed to the light passed therethrough, said photoelectric cell being embedded in the central portion of said face.

5. Apparatus as set forth in claim 4 further including a universal joint mounting said housing for tiltable and rotatable movement, said housing being adapted for manual adjustment to a position where only the central spot of light is passed through said aperture to said photoelectric cell and said light transmitting member.

6. A device for aligning a light-responsive element with the beam from a source of light, comprising a housing, a lens mounted at the front end of the housing and exposed to the light beam, a disc having a central opening therethrough positioned at the focal point of said lens, said disc being fixedly supported in said housing, said lens and said disc being cooperable to transmit various spectral colors of the light beam to the interior of said housing along a central axis thereof, the color transmitted being dependent upon the degree of alignment of said housing with the light beam, a light-transmitting member mounted in said housing along the central axis thereof for displaying the spectral colors, and an aperture in the rear wall of said housing for viewing said light-transmitting member in order to adjust the alignment of said housing with the light beam until a desired color is transmitted.

7. A device as set forth in claim 6 wherein said disc is a plate of thin sheet metal, the central opening therein having a sharp edge thereabout to cooperate with said lens for transmission of the spectral colors of the light beam.

8. A device as set forth in claim 7 wherein said lens is a single element lens having chromatic aberration producing a central image of the light source, fringed with rings of the spectral colors, said device further including a photoelectric cell mounted in said light-transmitting member and adapted for response to the central image when said housing is in alignment with the light beam.